United States Patent [19]

Cross et al.

[11] Patent Number: 4,528,792
[45] Date of Patent: Jul. 16, 1985

[54] ANCHORING CARTRIDGES

[76] Inventors: Robert C. Cross, 13 Old Kilcullen Rd., Bryanston 2021, Transvaal; Ernest Cranko, P.O. Box 3850, Alrode, Transvaal 1451, both of South Africa; Michael J. Dransfield, 4 Aubrey Ave., London, Colney, Hertfordshire, United Kingdom

[21] Appl. No.: 265,981
[22] PCT Filed: May 24, 1979
[86] PCT No.: PCT/GB79/00080
    § 371 Date: Jan. 30, 1980
    § 102(e) Date: Jan. 30, 1980
[87] PCT Pub. No.: WO 79/01144
    PCT Pub. Date: Dec. 27, 1972

[30] Foreign Application Priority Data

| May 30, 1978 | [GB] | United Kingdom | 24647/78 |
| Jun. 29, 1978 | [GB] | United Kingdom | 28262/78 |
| Jul. 21, 1978 | [GB] | United Kingdom | 30753/78 |
| Jul. 21, 1978 | [GB] | United Kingdom | 30754/78 |

[51] Int. Cl.³ .......................................... E21D 20/02
[52] U.S. Cl. .................................... 52/704; 52/743; 206/219; 405/261
[58] Field of Search .................. 405/259, 260, 261; 52/704, 741–743, 745, 750; 206/219, 220

[56] References Cited

U.S. PATENT DOCUMENTS

| 3,921,800 | 11/1975 | Burns | 405/261 |
| 3,925,996 | 12/1975 | Wiggill | 405/261 |
| 3,955,992 | 5/1976 | Roberts | 106/92 |
| 4,126,005 | 11/1978 | Coursen | 405/261 |
| 4,157,116 | 6/1979 | Coulter | 166/281 |

FOREIGN PATENT DOCUMENTS

| 233091 | 3/1961 | Australia | 405/260 |
| 629335 | 4/1936 | Fed. Rep. of Germany . | |
| 2005161 | 10/1970 | Fed. Rep. of Germany . | |
| 2157896 | 11/1971 | Fed. Rep. of Germany | 405/260 |
| 2228270 | 6/1972 | Fed. Rep. of Germany | 405/260 |
| 2143440 | 3/1973 | Fed. Rep. of Germany . | |
| 2615316 | 10/1977 | Fed. Rep. of Germany . | |
| 2350298 | 3/1978 | Fed. Rep. of Germany . | |
| 2840967 | 4/1979 | Fed. Rep. of Germany . | |
| 1085192 | 1/1955 | France . | |
| 1385904 | 12/1964 | France . | |
| 2184041 | 12/1973 | France . | |
| 2404110 | 4/1979 | France . | |
| 7809591 | 3/1979 | Netherlands . | |
| 734658 | 8/1955 | United Kingdom . | |
| 1313263 | 4/1973 | United Kingdom . | |
| 1382054 | 1/1975 | United Kingdom . | |
| 1384364 | 2/1975 | United Kingdom . | |
| 1448760 | 9/1976 | United Kingdom . | |
| 1460588 | 1/1977 | United Kingdom . | |
| 1503913 | 3/1978 | United Kingdom . | |
| 2004965 | 4/1979 | United Kingdom . | |

OTHER PUBLICATIONS

"La Technique Moderne" vol. XLVIII, No. 9, 9/6/56 (La Technique Moderne; Paris, France) W. DeWetlinsky, Les Soulons Plafonniers, see p. 469, right hand column, FIG. 10.

Primary Examiner—John E. Murtagh
Assistant Examiner—Andrew J. Rudy
Attorney, Agent, or Firm—Caesar, Rivise, Bernstein & Cohen, Ltd.

[57] ABSTRACT

An anchoring cartridge for use in anchoring an anchor element in a hole in a substrate by means of a self-setting composition comprising interactive solid and liquid components. The cartridge comprises a container (1) housing the solid component (4) of the composition, the container being formed of a material such as metal or plastics, which does not absorb the liquid component of the composition. The container has a plurality of holes (2), preferably each between 0.1 mm2 and 500 mm2 in area, whereby when the cartridge is immersed in the liquid component, the liquid passes through the holes (2) into the container (1) and reacts with the solid component (4) to form the self-setting composition. When the cartridge is immersed in the liquid component, loss of self-setting composition through the holes (2) is prevented by, for example, including a thixotropic agent in the composition or by compaction of the solid component (4). The invention includes a method of anchoring an anchor element in a hole in a substrate using the cartridge.

4 Claims, 5 Drawing Figures

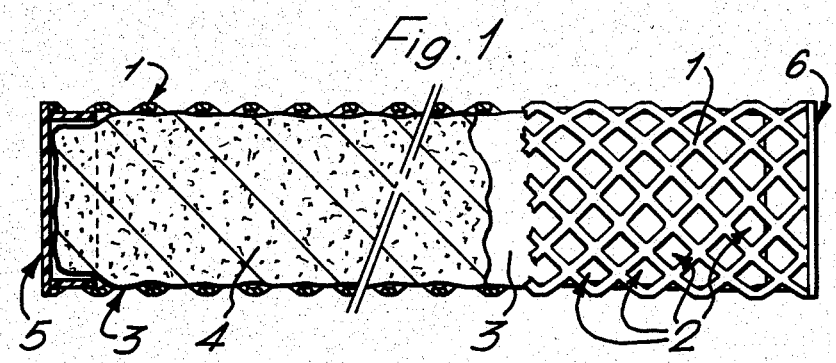
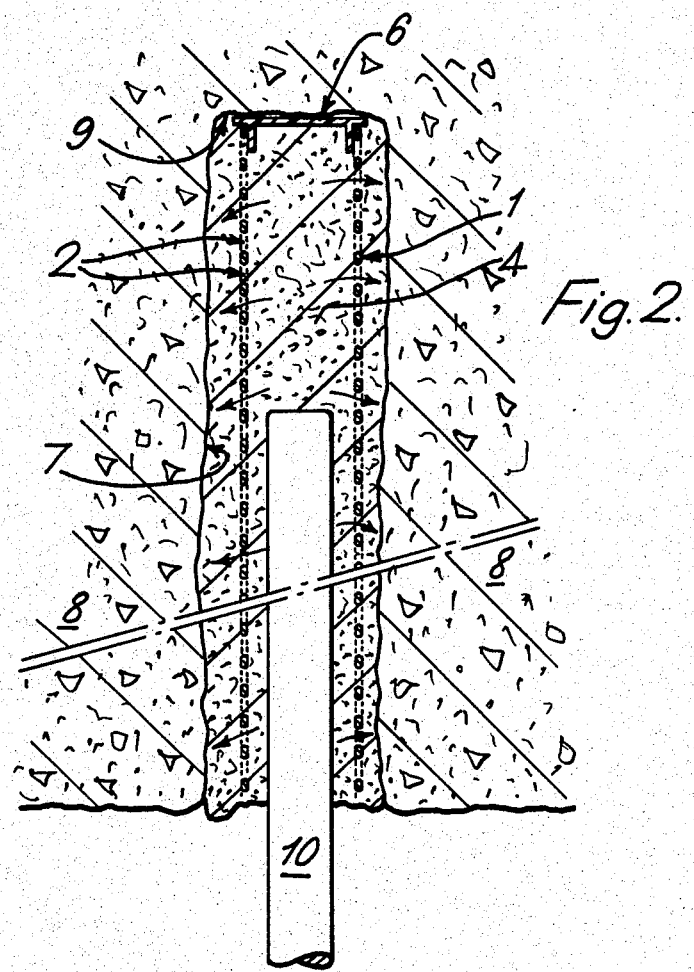

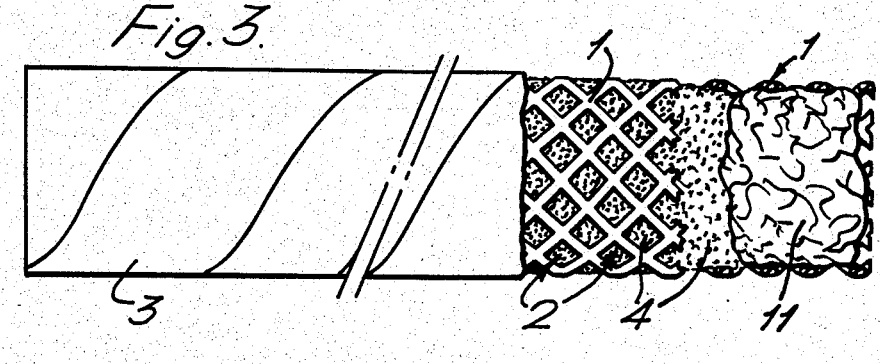
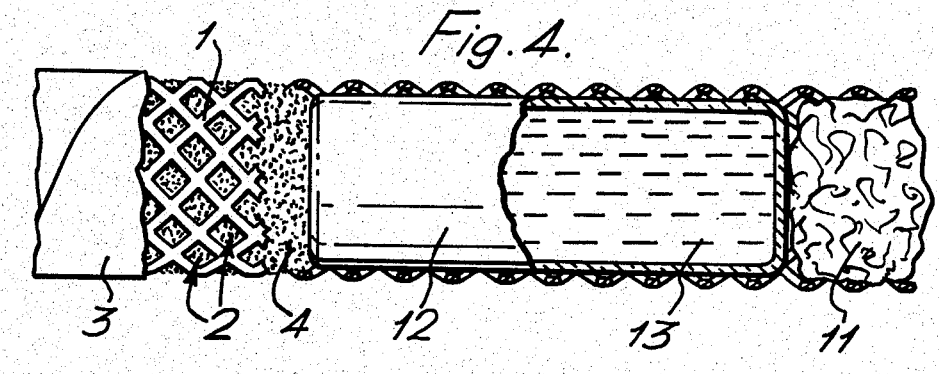
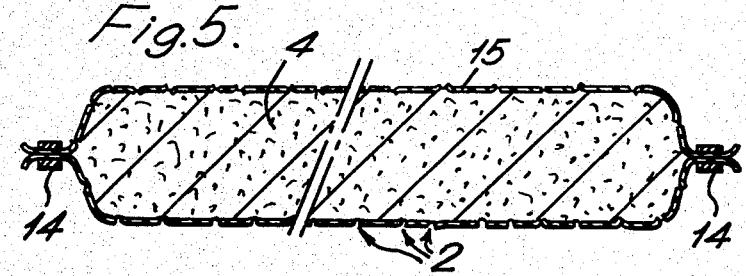

ANCHORING CARTRIDGES

This invention concerns anchoring cartridges for use in anchoring an anchor element in a hole in a substrate, the cartridge, as used, containing both a solid component and a liquid component, the components being interactive to form a self-setting coomposition.

OLS No. 2 350 298 describes an anchoring cartridge which comprises an absorbent paper jacket filled with a dry mortar composition which includes a quick-setting agent for the mortar. In use, the cartridge is first immersed in a container filled with water so that the water soaks through the absorbent paper jacket and moistens the mortar composition. The cartridge is then removed from the water and rammed up a blind hole. This process is repeated using additional cartridges until the hole is substantially filled. A specially designed anchor bolt is then pushed with rotation into the hole, the bolt being rotated to mix the quick-setting mortar and to prevent the mortar from flowing out of the hole. There are several technical problems with this known cartridge. One problem is that the strength of the paper jacket is considerably reduced when the cartridge is immersed in water. This limits the length of the cartridge to about 1 meter, since it is difficult to handle the cartridge without the jacket disintegrating. In addition a specialised anchor bolt is required.

It is an object of this invention to provide an anchoring cartridge of the general type described, which may be used with greater convenience and efficiency.

According to the invention there is provided an anchoring cartridge for use in anchoring an anchor element in a hole in a substrate by means of a self-setting composition comprising interactive solid and liquid components, the cartridge comprising a container housing the solid component of the self-setting composition, the container being formed of a material which does not absorb the liquid component of the composition, the container having a plurality of holes whereby when the cartridge is immersed in the liquid component the liquid passes through the holes into the container there to interact with the solid component to form the self-setting composition, and including means to reduce loss of the self-setting composition via the holes when the cartridge is immersed in the liquid component.

Preferably the solid component is a hydraulically setting material such as a hydraulic cement, a plaster such as stucco, gypsum or dolomite plaster, lime or anhydrite, and the liquid component is water. The solid component may be mixed with a liquid which is non-reactive with the solid, to form a water-miscible slurry, although best results will usually be achieved if the solid component is dry. The invention is not limited to the use of hydraulically setting materials and the use of solids which react with other liquids is possible, for example resin-based solids.

The means to reduce loss of the self-setting composition from the cartridge may be chemical or mechanical means or both. An especially preferred means is a thixotropic agent for the self-setting composition. The amount of thixotropic agent present may range from 0.0001% to 5% of the total weight of the solid component. Preferred is from 0.001% to 1% of the total weight of the solid component. Many thixotropic agents are suitable for use with the invention. Examples of suitable thixotropic agents are sodium carboxymethyl cellulose, high molecular weight polymer oxides such as polyethylene oxide or polypropylene oxide, and high molecular weight glycols. Polyacrylamide is an especially preferred thixotropic agent because of its low cost and low toxicity.

The solid component will usually include a plasticiser for the self-setting composition. Examples of suitable plasticisers are sulphonated melamine/formaldehyde condensates, condensation products of $\beta$-naphthalene sulphonic acid/formalin, nonionic surfactants, and lignin dispersing agents such as calcium lignosulphonate.

It will be appreciated that although it is preferable for the thixotropic agent and/or the plasticiser to be included in the solid component, they may be present in the liquid in which the cartridge is to be immersed.

When minimising loss of self-setting composition by mechanical means it is much preferred that the solid component be dry and compacted to a bulk density which is sufficient to reduce loss of self-setting composition via the holes when the cartridge is immersed in the liquid component. A bulk density of from 0.5 g.cm$^{-3}$ to 2.0 g.cm$^{-3}$ is preferred. If the bulk density is below 0.5 g.cm$^{-3}$, a significant amount of the solid component, and often of the self-setting composition, may be lost from the cartridge through the holes. In addition, where the solid component is a hydraulic cement for example, the water to cement ratio of the self-setting composition will be too high. If the bulk density is above 2.0 g.cm$^{-3}$, the self-setting composition will be too compacted to allow an anchor element to be pushed into the cartridge as described below. Especially preferred values of the bulk density lie between 1.2 g.cm$^{-3}$ and 1.8 g.cm$^{-3}$.

Preferably the area of each hole in the container is from 0.1 mm$^2$ to 500 mm$^2$. The holes will in most cases be bigger than the particles of the solid component, which facilitates entry of the liquid component into the cartridge and, in addition, when the cartridge is used to anchor an anchor element in a hole in a substrate, considerably less pressure is required to urge the anchor element into the cartridge.

Preferably the container is of a relatively strong material such as metal or plastics.

It will be a substantial advantage if the holes in the container are occluded by a material which prevents the solid component from passing out of the holes before the cartridge is immersed in liquid, but which allows the liquid to enter the cartridge via the holes when the cartridge is so immersed. This material may be absorbent paper such as crepe paper or tissue paper. Superior results may be obtained if the material which occludes the holes is soluble in the liquid component of the self-setting composition. One such material is polyvinyl alcohol which is soluble in water and organic solvents. The occluding material may be disposed over the inside of the container, and may, conveniently constitute a jacket for the solid component. Preferably the material is disposed about the outside of the container in which case the material may be a bag or sleeve applied over the outside of the container, or the material may be a flat strip which is spirally wrapped about the container.

In one particularly useful embodiment of the invention, the container comprises a tube sealed at each end, at least a portion of the tube having a mesh wall. Tubes of metal or plastics mesh are available commercially and are easily cut on-site to the required length and the cut ends sealed, preferably by means of paper or cork plugs. In this type of cartridge, the area of each hole in the mesh wall is preferably from 5 mm$^2$ to 200 mm$^2$.

In another embodiment of the invention, the container is a flexible plastics skin, a preferred plastics being polyester. Holes may be easily made in the skin by means of a suitable pointed instrument. The preferred area of each hole in the skin is from 0.1 mm$^2$ to 16 mm$^2$, and most preferably from 1 mm$^2$ to 5 mm$^2$.

Cartridges according to the invention are preferably immersed in the liquid component for between 30 seconds and 30 minutes to allow the liquid to enter the cartridge.

Suitable anchor elements are softwood or hardwood dowel, plain steel tubing with sealed ends, or a metal rod or bar either with or without external ribs.

The cartridge is preferably between 1 m and 5 m in length, although much shorter lengths may be used if required. The diameter of the cartridge is typically from 13 mm to 45 mm.

The cartridge may to advantage include the interactive components of a self-setting resinous composition within the container at one end thereof. The interactive components may suitably be provided in the form of a package which contains the resin and a hardener therefor, the resin and the hardener being held in separate compartments. Suitable packages are described in British Pat. Nos. 1,460,588 and 1,384,364. A cartridge including such a package is first immersed in the liquid and is then inserted into a hole in a substrate with the package-containing portion leading. An anchor element is then driven axially into the cartridge. When the element reaches the resin package, the leading end of the anchor element ruptures the package to release the resin and hardener which interact and quickly set to anchor the element in the hole. The set resin firmly holds the anchor element until the main self-setting composition hardens.

In a useful modification of a cartridge according to the invention, a quick-setting cement is included in a portion of the cartridge. Alternatively a set-accelerator for the self-setting composition is included in a portion of the cartridge. Examples of suitable set accelerators include sodium aluminate, sodium or lithium carbonate, sodium silicate and sodium chloride, one or more of which may be intermixed with the solid component. The set accelerator may to advantage be a liquid which is contained in a frangible capsule within the container so that the capsule is broken when an anchor element is urged into the cartridge, thus releasing the set accelerator.

The solid component may contain other additives such as set retarders, examples of which include lignosulphonate and polyhydroxy carboxylic acid salts. In many applications it may be particularly advantageous to include an expanding agent such as finely divided aluminium or zinc. Some solid binders such as expansive cement, gypsum, or anhydrite may expand on their own and so additional expanding agents may not be required.

The solid component may also include fillers such as a fibrous material or an inert particulate filler such as silica sand. Examples of suitable fibrous materials include asbestos fibres, cellulose or cotton fibres and manmade fibres such as nylon or rayon.

The invention includes a method of anchoring an anchor element using a cartridge as described.

The invention will now be described by way of example, with reference to the accompanying diagrammatic drawings, in which:

FIG. 1 is a side view, partly cut away in longitudinal section, of a cartridge according to the invention, FIG. 2 is a longitudinal section through the cartridge of FIG. 1 being used to anchor an anchor element in a hole in a substrate, FIG. 3 is a side view, partly in section, of another cartridge according to the invention, FIG. 4 is an end portion, partly in section, of a cartridge which is similar to that of FIG. 3, and FIG. 5 is a longitudinal section through another cartridge according to the invention.

The cartridge shown in FIG. 1 comprises a metal tube 1 having a mesh wall. The tube is about 1½ m long and about 40 mm in diameter. Each hole 2 of the mesh occupies an area of about 0.65 mm$^2$. Within the tube 1 is a thin absorbent paper jacket 3 which is packed with a premixed dry hydraulic cementitious composition 4 to a bulk density of about 1.5 g.cm$^{-3}$.

The composition 4 was prepared by mixing together the following components in the stated number of parts by weight:

Ordinary Portland cement: 100 sodium carboxy methyl cellulose (thixotropic agent): 0.2 calcium lignosulphonate (plasticiser): 0.1 aluminum powder (expansion agent): 0.01

Each end of the tube is sealed by a plastics end-cap 5, 6.

In use, the cartridge is immersed in water for between 2 and 30 minutes, which is sufficient time to allow the water to penetrate the paper jacket 3 and moisten the hydraulic cementitious composition 4. The paper jacket is weakened by contact with the water and may even split, but the thixotropic agent tends to stop the moist cementitious composition from flowing out of the tube through the holes 2. The compaction of the cementitious material also assists in this respect. The cartridge is then removed from the water and inserted into, for example, an upwardly inclined hole 7 in a loose substrate 8, as shown in FIG. 2. (Alternatively, the hole may be horizontal or downwardly inclined as required). The cartridge shown in FIG. 1, is of about the same length as the hole 7 and the diameter of the cartridge is slightly less than that of the hole. When the leading end cap 6 of the cartridge contacts the blind end 9 of the hole, a wooden dowel 10 is hammered through the outermost end cap 5, not shown in FIG. 2. The rod 10 is then pushed into the cartridge so that the moist cementitious composition 4 is urged through the weakened paper jacket 3 and the holes 2, and so out of the cartridge and into the annular space between the cartridge and the wall of the hole 7. The cementitious composition does not flow out of the hole 7, because of the presence of the thixotropic agent. The composition sets within about 60 minutes securely to key the rod 10 in the substrate 8.

An anchorage of good strength is formed without the need to rotate the anchor element during insertion into the hole, because the paper, which is weakened by contact with the water, is broken up into small pieces as the cementitious composition flows out of the holes in the tube. The cartridge is easily handled both before and after immersion in water, because of the relative rigidity of the tube 1.

Plugs of cork or crumpled paper for example, may be used in place of the plastics end caps, the plugs being removed from the wet cartridge to facilitate insertion of the rod 10 into the cartridge.

The cartridge shown in FIG. 3 comprises a metal tube 1 having a mesh wall. The tube is about 3 m long and about 45 mm in diameter. Each hole 2 of the mesh is about 0.8 cm² in area. A strip 3 of crepe paper is spirally wrapped about the tube 1 along the whole length of the tube. (In FIG. 3, the paper has been removed from an end portion of the tube to reveal the inside of the cartridge). The sides of the strip overlap slightly on each turn of the spiral. The ends of the tube 1 are plugged by crumpled pieces of paper 11, only one of which is shown, which are pushed into the ends of the tube. The tube contains a premixed dry hydraulic cementitious material 4 which is compacted to a bulk density of about 1.5 g.cm$^{-3}$.

The composition 4 was prepared by mixing together the following components in the stated number of parts by weight:
   Ordinary Portland cement: 100
   polyacrylamide (thixotropic agent): 0.2
   calcium lignosulphonate (plasticiser) 0.1
   aluminium powder (expansion agent) 0.01
   asbestos fibres: 5

In practice, the cartridge may be mass-produced under controlled factory conditions in standard lengths of say 3 m and the cartridges may then be taken to the place of use where they may be cut to lengths to suit the particular application, the cut ends being sealed by paper plugs to prevent the dry material from falling out of the cartridge. The cartridge is then immersed in water, which may be a stream in a mine tunnel for example. After about one minute, when the crepe paper has become wet, the paper is removed from the outside of the tube by hand. There is no significant loss of the cementitious material from the tube through the holes, even where the cartridge is immersed in a flowing stream of water. After a further 2 minutes or so, sufficient water has been absorbed by the cementitious material to make the cartridge ready for use, although the cartridge may be left in the water for up to 30 minutes without adverse results. When the cartridge is required for use, it is removed from the water and the plugs of paper are removed from the ends of the cartridge to facilitate entry of an anchor element. The cartridge is then inserted into a hole in a substrate until the leading end of the cartridge contacts the blind end of the hole. The cartridge will usually be of about the same length as the hole and the diameter of the cartridge will usually be slightly less than that of the hole. The volume of the annular space between the tube and the wall of the hole should always be less than the volume of the cementitious material within the cartridge, and the anchor element used should be dimensioned to eject enough of the material to fill that annular space. The anchor element is pushed by hand or hammered axially into the cartridge to cause the cementitious material to flow through the holes of the tube, as described above with reference to FIGS. 1 and 2.

The cartridge is easy to handle and there is no significant loss of the cementitious material from the cartridge prior to insertion of the anchor element. With both of the cartridges described above, the metal tube provides a major part of the strength of the anchorage, allowing the anchor element to be made of a relatively cheap material such as wooden dowel, although a steel rod may be used to provide additional strength for the anchorage. Although paper is used to retain the cementitious material within the cartridges during storage, a water-soluble material such as polyvinyl alcohol may be used in place of the paper. Corks may be used to plug the ends of the cartridge in lieu of paper plugs.

A modification of the cartridge of FIG. 3 is shown in FIG. 4 in which an end portion of the cartridge includes a glass capsule 12 within the tube 1. The capsule is held in place within the tube by means of a paper plug 11 which is forced into the tube after the capsule is inserted. The capsule contains a liquid set accelerator for the cementitious material 4. In use, the pre-wetted cartridge is pushed into the hole with the end containing the capsule leading. When the anchor element is pushed into the cartridge, as described, the leading end of the element breaks the glass capsule and the set accelerator is released to intermix with the moist cementitious composition adjacent the capsule so that this portion of the composition sets relatively quickly to hold the anchor element in place. This modification is particularly useful where it is required to tension the anchor element soon after the element is urged into the hole. Alternatively, a plastics skin containing a resin and a hardener therefor in separate compartments may be used in place of the glass capsule. The anchor element ruptures the plastics skin and releases the resin and catalyst so that they intermix and set quickly, firmly to anchor the element in the end of the hole.

The cartridge shown in FIG. 5 comprises a tubular skin 15 of flexible polyester film, sealed at each end by a metal clip 14. The skin has numerous holes or perforations 2, each of which is about 1 mm² in area. The skin 15 contains the same hydraulic cementitious material as that used in the cartridge of FIG. 3. The cementitious material does not pass through the perforations in a significant amount because of the compaction of the cementitious material 4 which has a bulk density of about 1.5 g.cm$^{-3}$.

In use, the cartridge is immersed in water for between 2 and 30 minutes to allow the water to enter the skin 15 through the perforations 3 and wet all the cementious material. The cartridge is then removed from the water and inserted into a hole in a substrate. An anchor bar or similar element is then hammered up the hole into the cartridge. This causes the skin to split along its length thus releasing the wet cementitious material. If desired, the bar may be rotated to shred the skin but this is not essential for a secure anchorage to be formed. The cementitious material then sets to anchor the bar in the hole.

The ends of the polyester tube may be sealed by alternative means such as knotting or heat-sealing.

We claim:

1. A method of anchoring an anchor element in a borehole in a substrate, the method comprising immersing in a water a cartridge container having walls containing a dry hydraulic cement composition, the cartridge having holes in the container wall whereby water may enter the container to wet the dry cement composition, wherein to reduce loss of wetted cement via said holes in the container wall, said dry hydraulic cement composition containing a thixotropic agent in sufficient quantity to reduce loss of wetted cement via the holes in the container wall when said container is immersed in water, said dry hydraulic cement composition also being compacted to a bulk density of from 0.5 g. cm.$^{-3}$ to 2.0 g. cm.$^{-3}$ to prevent loss of wetted cement composition via the holes, removing the cartridge from the water and inserting the cartridge into the borehole, whereby on insertion of the anchor element into the borehole there is breaking of the cartridge and release the wetted cement composition to anchor the anchor element in the borehole, and whereby on insertion of said anchor element, the thixotropic agent serves to maintain the flowability of the wetted cement which is capable of flowing through said holes in the container wall.

2. A cartridge for use in a method according to claim 1, said cartridge comprising a container housing a dry hydraulic cement composition, the container having a wall which is provided with a plurality of holes arranged to allow liquid water therethrough into the container to wet the cement composition, the composition including a dry hydraulic cement and a thixotropic agent to reduce loss of wetted cement via the holes in the container wall when said container is immersed, said dry hydraulic cement composition being compacted to a bulk density of from 0.5 g. cm.$^{-3}$ to 2.0 g. cm.$^{-3}$ to prevent loss of wetted cement composition via the holes.

3. A cartridge according to claim 2, wherein the container comprises a tube of flexible plastics skin, the ends of which are sealed.

4. A cartridge according to claim 2, wherein the container comprises a tube of flexible plastics skin, the ends of which are sealed.

* * * * *